United States Patent [19]
Horrell

[11] 3,870,096
[45] Mar. 11, 1975

[54] LOCKING DEVICE FOR ROLL-UP AWNINGS

[75] Inventor: Robert E. Horrell, Northridge, Calif.

[73] Assignee: Carter Mfg., Inc., Sun Valley, Calif.

[22] Filed: June 11, 1973

[21] Appl. No.: 368,763

[52] U.S. Cl. ............................................. 160/305
[51] Int. Cl. ............................................ E06b 9/208
[58] Field of Search .......... 160/291, 293, 294, 298, 160/299, 300, 301, 302, 305; 188/82.2, 82.84

[56] References Cited
UNITED STATES PATENTS
1,624,053  4/1927  Husted................................ 160/302

Primary Examiner—Peter M. Caun
Attorney, Agent, or Firm—Spenseley, Horn & Lubitz

[57] ABSTRACT

A mechanism which will automatically lock roll-up awnings into any desired position is disclosed. The mechanism employs a knurled eccentric brake which contacts a drum, thereby automatically locking the awning into position. The friction locking device provides safety features for roll-up awnings not available in the prior art.

10 Claims, 6 Drawing Figures

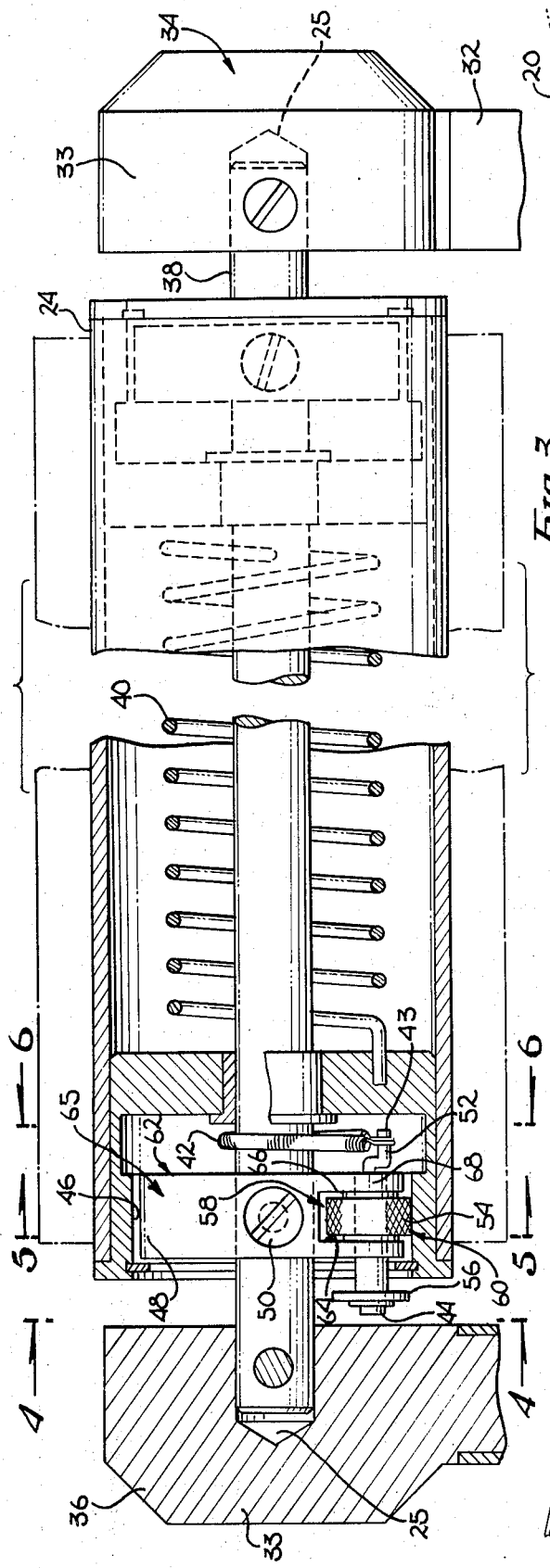
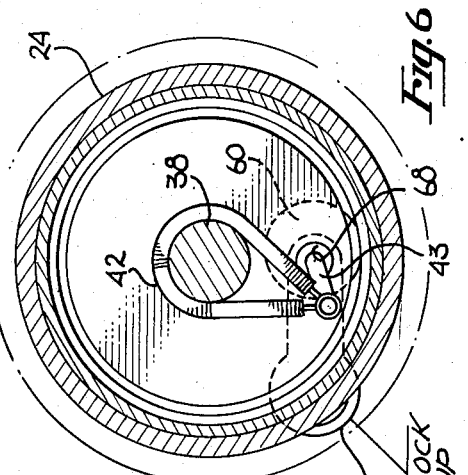
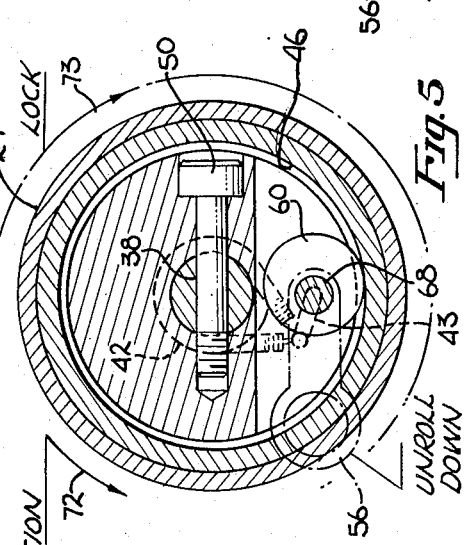
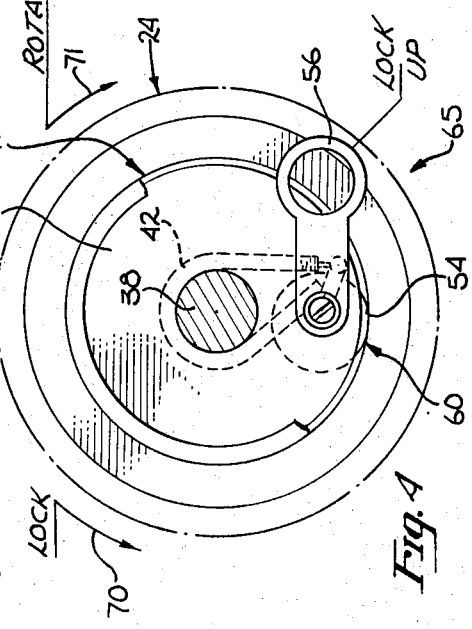

LOCKING DEVICE FOR ROLL-UP AWNINGS

BACKGROUND OF THE INVENTION

1. Field of the Invention

The invention relates to locking mechanisms which are employed in roll-up awnings.

2. Prior Art

The present invention is employed to lock into various positions roll-up awnings such as those installed on recreational vehicle and mobile homes. These awnings are usually secured to the top side of the recreational vehicle such that when unrolled they project from the side of the vehicle providing a shaded area. Awnings, when in the roll-up or travel position, require positive locking mechanisms to overcome high wind forces which tend to unroll and separate the awning from the vehicle and vibrations which may mechanically cause the awning to become loose and unrolled or torn from the vehicle. The awnings are subjected to particularly large wind forces when the vehicle is driven at high speeds.

It should be noted that while the present invention is specifically described as being utilized in travel vehicles it may be used in other awning installations.

A useful mechanical assembly for the roll-up awning must be capable of locking the awning into a least two positions, open and closed. The awning must be securely locked in a rolled-up or closed position, when the vehicle is traveling to prevent wind damage, and locked into the open position, so that it will not collapse while in use.

The locking devices employed in the prior art are ineffective for locking the awning particularly in the roll-up position, in addition to other positions. For example, such a prior art device is shown in U.S. Pat. No. 3,324,869. This patent describes a device employed frequently in the trade. Two locking devices are employed, one to mechanically fasten the awning in the closed position, and a second telescoping member to lock the awning in its open position.

Several problems are encountered with the prior art devices when securing the roll-up awning into position against a vehicle. First, the locking device utilizes a turnbuckle type assembly having a hook which fits over the awning supporting arm. This device when subjected to vibration tended to unlock, thereby exposing the awning to wind damage. Secondly, the locking mechanism requires affirmative action to be taken when securing the awning, i.e., by fastening a mechanical locking mechanism around the awning support arm. If the locking device is negligently left unsecured the awning will often be separated from the vehicle damaging the awning and possibly causing damage to other vehicles.

Since the above described prior art mechanical fastener only secured the awning in place when closed, an additional locking mechanism was required to secure the awning in the open position. The prior art often used a telescoping stiffener which is braced against the roller and the side of the vehicle. This telescoping stiffener prevents roll-up and collapse of the awning while in use. The present invention also requires this telescoping stiffener, for stability and safety when any wind conditions exist. However, these mechanism are not automatically activated nor positive in function. The present invention solves most of these problems as will be shown in detail below.

SUMMARY OF THE INVENTION

The locking mechanism of the present invention utilizes a brake and drum which engage and lock the awning in any position to provide a positive lock and hence prevent unwanted motion. The locking device is installed such that when the awning is placed in a desired position, it is permanently locked into that position. The device requires no positive action to be taken to secure it in place, it lock automatically.

The components of the locking mechanism includes a brake and brake drum, the brake drum is defined by the internal wall of the roller, with the brake being a disc with a knurled face, which can be positioned by the use of a lever into one of two positions. The first position allows the awning to be rolled toward the vehicle until motion is stopped, at which point the awning is automatically locked into position. When the lever is moved into a second position the brake is disengaged and allows the roller to be unrolled until motion is stopped and again the awning becomes locked into that position.

Thus, the present invention has eliminated many problems which occured in the prior art locking devices for roll-up awnings. in the present invention only one self-contained locking mechanism is utilized to lock the awning in every position. However, a telescoping stiffener is required when any wind conditions exist. In additiona, the present invention eliminates the possibility that vibration will loosen the locking mechanism, thereby exposing the awning to damage. As will be seen, the present invention provides numerous other advantages over the prior art.

BRIEF DESCRIPTION OF THE DRAWINGS

FIG. 3 is a cross section view of the roller and locking mechanism, taken through section line 3—3 of FIG. 2.

FIG. 4 is a cross section view taken through section line 4—4 of FIG. 3 showing the locking mechanism in a first position;

FIG. 5 is a cross section view taken through section line 5—5 of FIG. 3 showing the locking mechanism in a second position;

FIG. 6 is a cross section view takne through section line 6—6 of FIG. 3 showing the locking mechanism in the first position.

DETAILED DESCRIPTION OF THE INVENTION

Figure 1:
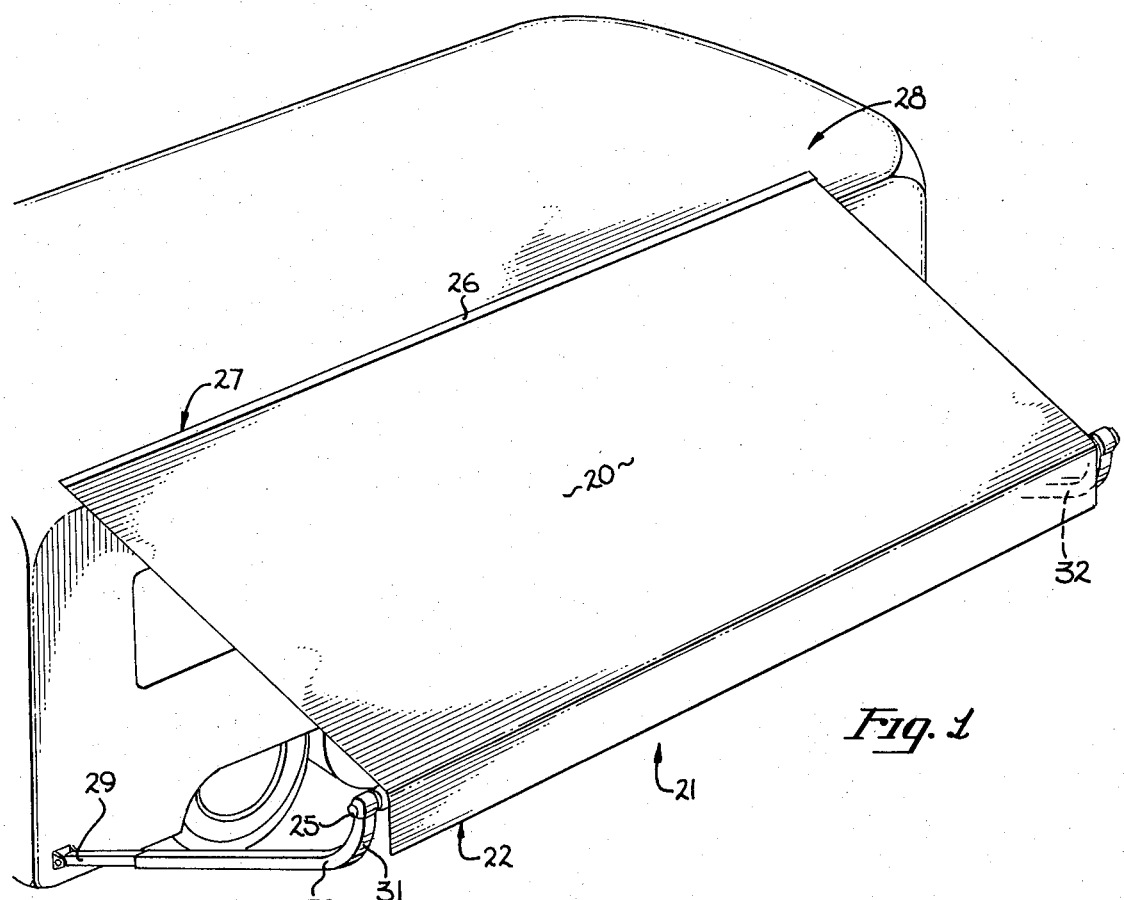
FIG. 1 shows in perspective a typical awning installed on a recreational trailer or mobile home.
Figure 2:
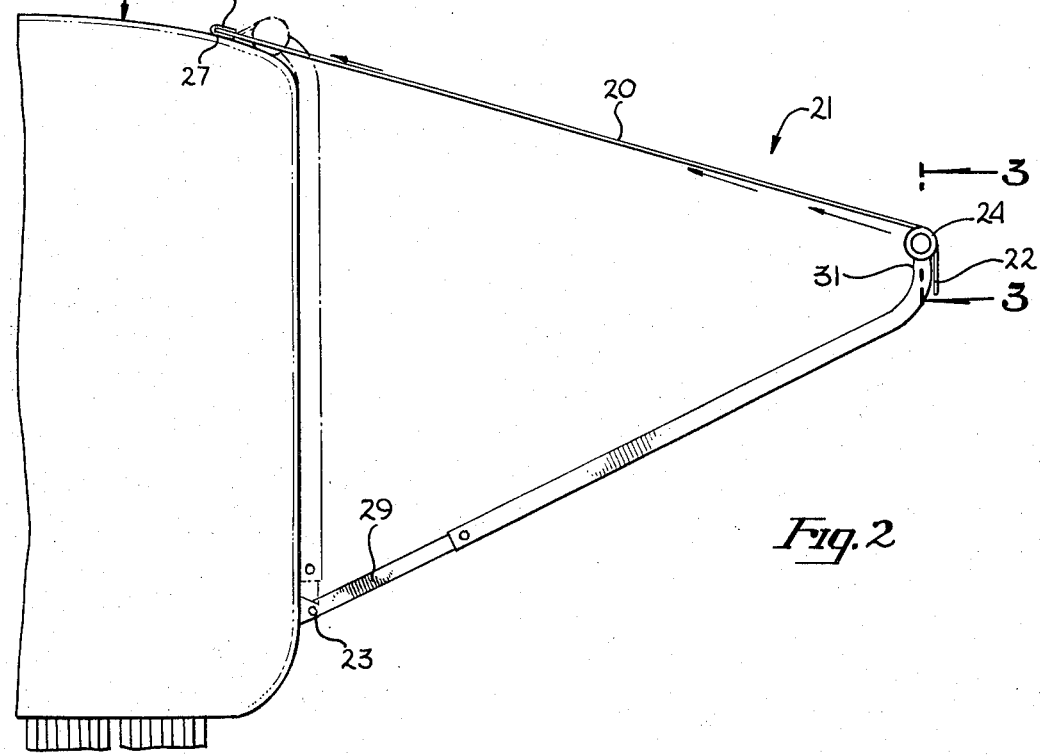
FIG. 2 is an end view of the awning of FIG. 1.

Referring now to FIG. 1, components of a typical awning installation are illustrated, partially diagrammatic to illustrate the environment and operation of the present invention. The awning unit 21 is shown mounted on a conventional recreational vehicle or mobile home 28. vehicle 28. The awning is secured along edge 26 of the awning 20 to the top of the vehicle 28 with the awning rail 27 (see FIG. 2) by methods well known in the prior art. The side arms 30 and 32 are pivotally mounted near the bottom of the vehicle 28 to provide support for the awning.

The awning unit 21 generally comprises a flexible fabric awning 20 which serves to provide shade, two side arms 30 and 32 and a roller 24 onto which the awning 20 may be rolled so that the awning 20 may be closed and attached to the side of the vehicle during travel.

The side arms 30 and 32 are fastened to the vehicle 28 by pivot sockets 23, or may stand vertically and act as a column while bearing on the ground. Pivot sockets 23 allow the side arms to move in a vertical plane in relation to the vehicle 28 while the low ends 29 rotate in sockets 23 as the awning is opened or closed. Generally the side arms are telescopic to allow extension and contraction to accommodate the change in length of the awning as the awning is opened and closed (see FIG. 2). End 31 of the side arm 30 is fastened to the roller 24 by pin means 25. The pin means 25 is secured thrugh cap 33 (see FIG. 3) and main shaft 38 such that the main shaft 38 may rotate freely while the end cap 33 remains fixed in relation to the arm 30. Arm 32 is likewise coupled to the shaft 38 in a similar manner.

The roller 24, best shown in FIG. 3 is used to support and hold the awning 20. The elongated roller 24 is generally cylindrical in shape and is fabricated from a light metal such as aluminum. The length of the roller 24 is slightly longer than the length of the awning 20, such that the awning may be readily rolled onto the roller. In addition to holding the awning 20, the roller 24 serves to house a coil spring 40 which stores the energy to roll up the awning as is done in the prior art.

The locking or braking device 65 (see FIG. 3) generally comprises a brake drum 46, a crank 43, a lever arm 56, and a disc 48 which includes a generally cylindrical segment or trough 58 into which a brake 60 is mounted on a shaft. The shaft includes the crank 43 and lever arm 56.

The brake drum 46 which is defined by the interior of roller 24 is disposed at one end of the roller 24 adjacent to one of the caps 33. The diameter of the cylindrical brake drum 46 is slightly larger than the outer diameter of the disc 48. Only one braking mechanism 65 is required for each awning unit 21. Thus, only one end of the roller 24 serves as the brake drum 46.

The brake 60 is generally a cylindrical disc, having a knurled surface 54 that engages the brake drum 46. The brake 60 is partially disposed within a channel shaped trough 58 which is cut into the cylindrical disc 48. The trough 58 which includes parallel sides 64 and 66 is cut into the cylindrical disc 48 parallel to the ends of the disc 48 such as end 62 to a depth larger than the diameter of the brake 60 so that the brake 60 may be rotated within the trough 58 without contacting the bottom of the trough.

A bolt 50 is radially disposed through the disc 48 into the shaft 38 such that the disc 48 rotates with the shaft 38.

The brake 60 is eccentrically and rigidly mounted on a shaft 68 which is disposed through thee parallel sides 64 and 66 (FIG. 3) of the trough 58. The shaft 68 is adaptable for rotational movement within the trough 58. one end of the shaft 68 defines the crank 43 while the lever arm 56 is rigidly coupled to the opposite end of the shaft. A coil spring 42 encircles the main shaft 38 with the ends of the coil spring being attached to the crank 43.

Referring first to FIG. 4, the lever arm 56 may be placed in one of two stable positions, the first position being shown in FIG. 4 and the second position being shown in FIG. 5. The brake 60 is mounted within the trough 58 such that the brake 60 contacts the brake drum 46 before the lever arm 56 contacts the shaft 38.

It may be readily seen from both FIGS. 4 and 5 that the spring 42 tends to urge the brake 60 against the drum 46 and to urge the lever arm 56 towards the shaft 38. The lever arm 56 may be readily manually moved from one position to the other since the eccentrically mounted brake 60 may be rotated within the trough 58 as previously mentioned.

Referring first to FIG. 4, with the lever arm 56 in the position indicated, it is apparent that the roller 24 may be rotated on the shaft 38 in the direction indicated by arrow 71, but that the roller and awning shaft will be locked when rotation is attempted in the direction indicated by arrow 70. Rotation in the direction indicated by arrow 71 causes the drum 46 to move the eccentrically mounted brake 60 away from the drum. On the other hand, when rotation is atempted in the direction indicated by arrow 70, the brake 60 is urged against the drum 46 and the knurled surface on the brake 60 prevents the shaft 38 form rotating relative to the end roller 20. The position indicated in FIG. 4 is referred to as the "lock up" position. The lever arm is placed in this position when the awning is to be rolled up. In this position, once the awning is in fact rolled up, it remains locked against the vehicle since one end of the awning 20 is secured to the vehicle. Thus, in operation, to roll up the awning, lever arm 56 is moved to the "lock up" position and the awning is simply rolled up and thereafter remains secure against the vehicle. It should be noted that if the awning is only rolled up part way it is nonetheless locked, since any attempt by the awning to unroll will cause the brake 60 to lock against the drum 46.

Referring to FIG. 5, the lever arm 56 is shown in its second position and in this position once again the spring 42 urges the brake 60 against the drum 46. With the lever arm in this position, it is apparent that the roller 24 may freely rotate in the direction indicated by arrow 72, but, that if the roller 24 is rotated in the direction indicated by arrow 73, the brake 60 will be caused to brakingly contact the drum 46, thereby locking the roller 24 relative to the shaft 38. This position is referred to as the "unroll" or "down" position since in this position the awning may be unrolled.

The entire braking mechanism may be fabricated utilizing known techniques with ordinary metal parts. While in the presently preferred embodiment an eccentrically mounted circular brake 60 has been utilized, a cam shaped brake could likewise be utilized.

Thus, a braking mechanism has been disclosed which has numerous advantages over the prior art.

I claim:

1. A locking apparatus for use in a roller comprising:
a brake drum;
a brake carrying means mounted within said drum for relative rotation within said drum;
a brake, rotatably mounted to said brake carrying means for contacting said drum, said brake having a first position in which relative rotation in a first direction between said drum and brake carrying means is prevented and where rotation in a second direction is permitted, and a second position in which relative rotation in said second direction between said drum and brake carrying means is prevented and where rotation in said first direction is permitted;

whereby an awning or the like mounted to said locking apparatus may be locked in a plurality of positions while moving in either direction.

2. The apparatus defined in claim 1 wherein said brake carrying means comprises a disc rigidly mounted to an awning shaft.

3. The apparatus defined in claim 2 wherein said brake drum is disposed within the interior of a roller upon which an awning is disposed, said roller being disposed about said awning shaft.

4. The apparatus defined in claim 3 wherein said brake comprises a cylindrical member eccentrically mounted to said disc.

5. The apparatus defined in claim 4 wherein said disc includes a trough into which said brake is rotatably mounted.

6. The apparatus defined in claim 5 wherein said brake is mounted on a brake shaft, one end of which defines a crank.

7. The apparatus defined in claim 6 wherein a spring is disposed about an awning shaft and coupled to said crank for urging said brake against said drum.

8. The apparatus defined in claim 7 wherein a lever arm is coupled to said brake shaft for manually moving said brake to said first and said second positions.

9. The apparatus defined in claim 8 wherein said drum is defined by the interior of said roller.

10. The apparatus defined in claim 9 wherein said brake includes a knurled surface.

* * * * *